Oct. 28, 1958  W. R. SMITH  2,857,726
MOVABLE ENGINE MOUNT FOR LAWN MOWERS
Filed Aug. 9, 1955  2 Sheets-Sheet 1
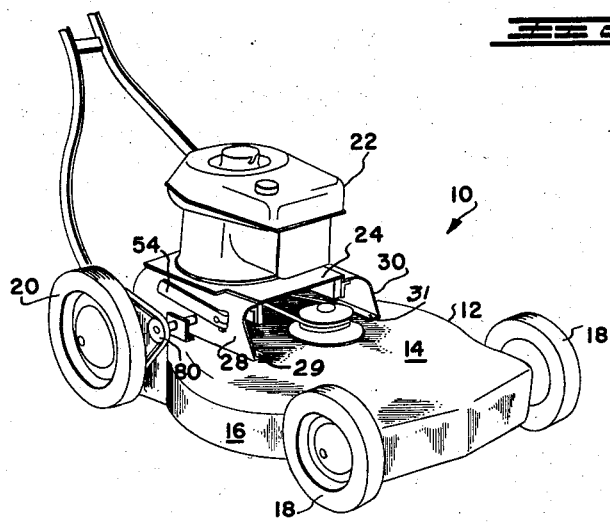
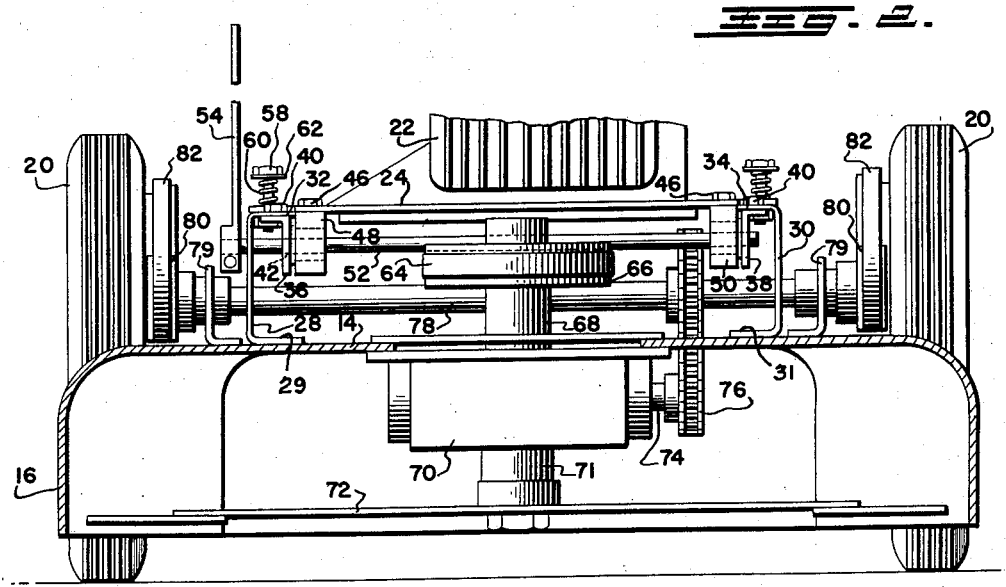
INVENTOR
WILLIAM R. SMITH
BY Neal, Browne, Schuyler
& Beveridge
ATTORNEYS Oct. 28, 1958 W. R. SMITH 2,857,726
MOVABLE ENGINE MOUNT FOR LAWN MOWERS
Filed Aug. 9, 1955 2 Sheets-Sheet 2
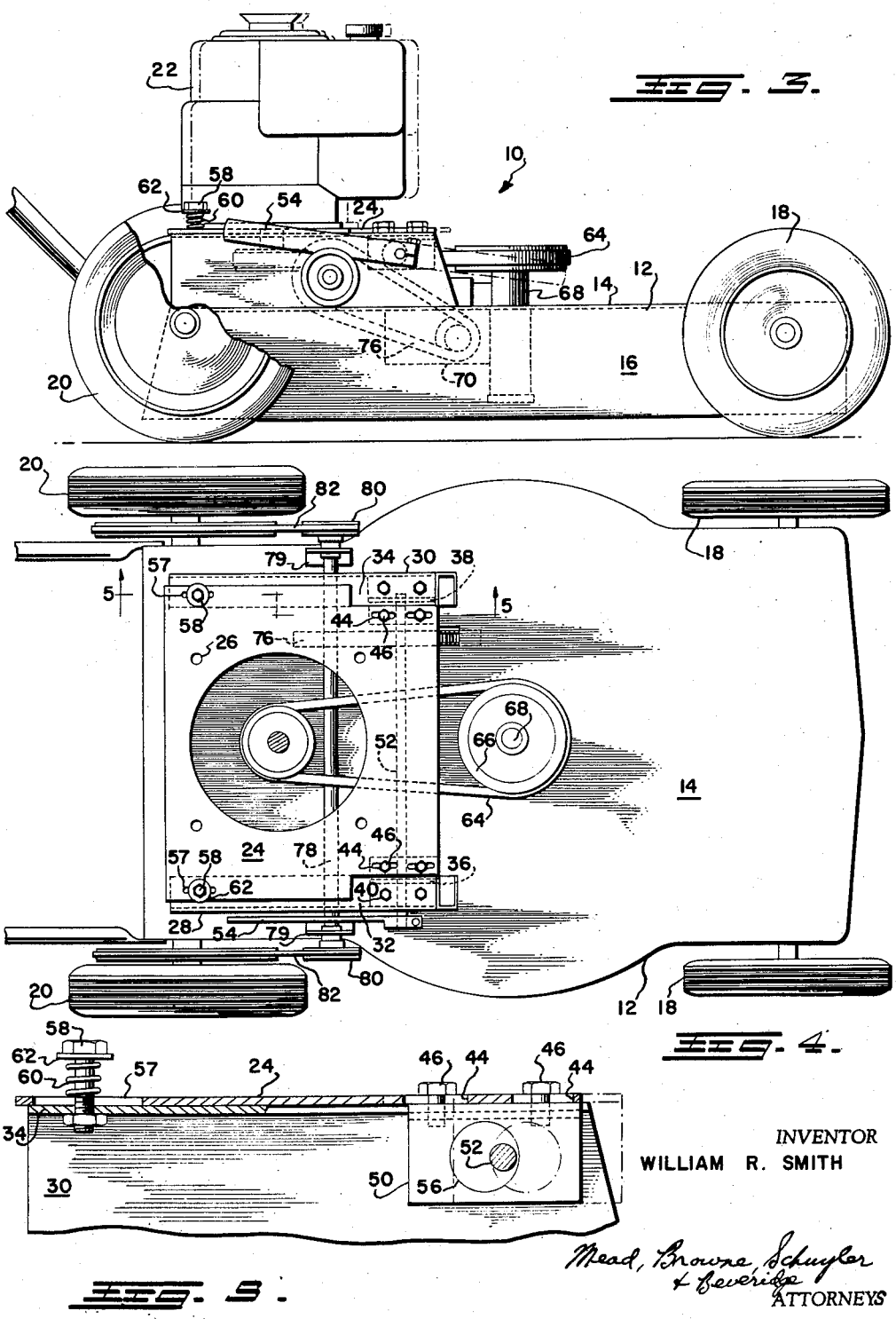
INVENTOR
WILLIAM R. SMITH
Mead, Browne, Schuyler
& Beveridge
ATTORNEYS

United States Patent Office 2,857,726
Patented Oct. 28, 1958

2,857,726

MOVABLE ENGINE MOUNT FOR LAWN MOWERS

William R. Smith, Atlanta, Ga., assignor to McDonough Power Equipment, Inc., McDonough, Ga., a corporation of Georgia Application August 9, 1955, Serial No. 527,207

10 Claims. (Cl. 56—25.4)

This invention relates to power transmissions for power units, and more particularly to an apparatus for connecting or disconnecting a prime mover, such as a gasoline engine, from the mechanism which it drives. The invention has particular utility in connection with mobile power units, such as power lawn mowers, and will be described as applied to such a unit.

It is an object of this invention to provide an inexpensive and easily operated device which permits an engine to be entirely disconnected from its load when starting.

It is a further object of this invention to provide a movable engine mount adapted to be mounted on a mobile power unit, such as a power lawn mower, for example, for removing the load from the prime mover, such as a gasoline engine, when starting the engine.

It is a still further object of this invention to provide a movable engine mount for use on power lawn mowers and the like in which sliding friction of the engine mount is reduced to a minimum during its movement.

In achievement of these objectives, there is provided in accordance with an embodiment of this invention adapted for use with a power lawn mower, a movable mounting plate upon which the engine for the mower is mounted. The mounting plate is supported by a pair of oppositely disposed longitudinally extending side rails which also support a transversely extending shaft on which are mounted a pair of eccentric members. The eccentric members are rotatably movable in bearing blocks supported from the underneath surface of the movable mounting plate in such manner that when rotation is imparted to the eccentric members the mounting plate is cammed upwardly and forwardly to loosen the belt connection between the engine and the mechanism which it drives. A reverse movement of the eccentrics restores the engine to a position in which the belt connection between the engine and the mechanism which it drives is again tight.

Further objects and advantages of the invention will become apparent from the following description taken in connection with the accompanying drawings, in which:

Fig. 1 is a perspective view of a power lawn mower provided with a movable engine mount in accordance with the invention;

Fig. 2 is an enlarged view in vertical section of the mower of Fig. 1;

Fig. 3 is an enlarged view in side elevation, partially broken away, of the mower of Fig. 1.

Fig. 4 is an enlarged top plan view of the mower of Fig. 1 with the engine removed to better illustrate details of the movable mounting plate; and Fig. 5 is an enlarged view in vertical section along line 5—5 of Fig. 4.

Referring now to the drawings, there is shown a power lawn mower of the rotary type generally indicated at 10 and comprising a frame or blade housing casing 12 having a substantially flat horizontal upper casing portion 14 and a downwardly depending wall or skirt portion 16.

Casing 12 is supported at its front end by a pair of oppositely disposed wheel members 18 and at its rear end by a pair of oppositely disposed drive wheel members 20. A power drive means in the form of a gasoline engine 22 is supported above casing 12 upon an engine mounting plate 24, engine 22 being suitably attached to mounting plate 24 by means of fastening devices, such as bolts, passing through apertures 26 (Fig. 4) in the mounting plate.

Mounting plate 24 rests upon a pair of oppositely disposed longitudinally extending side rails 28 and 30, respectively. Side rails 28 and 30 each have bottom flange portions 29 and 31, respectively, which are rigidly secured in fixed position to the upper surface 14 of casing 12. Each of the side rails 28 and 30 has at its upper end an inwardly extending flange portions 32 and 34, respectively. Right angle members 36 and 38 are secured by screws 40 to the underneath surface of the forward ends of the respective flange portions 32 and 34. Each of the respective angle members 36 and 38 is provided with a circular bearing aperture such as that indicated at 42 (Fig. 2) for supporting an eccentric shaft to be described.

The forward portion of each side of engine mounting plate 24 has a pair of aligned slots 44 (Fig. 4) for receiving screw members 46 which secure oppositely disposed bearing blocks 48 and 50, respectively, to the forward ends of the underneath surface of opposite sides of engine mounting plate 24. A shaft 52 extends transversely of the mower and is supported for rotation by the bearing apertures 42 of angle members 36 and 38 of the respective side rails 28 and 30. Shaft 52 projects beyond side rail 28 and carries an operating handle 54 which is rigidly secured to the projecting end of shaft 52.

Shaft 52 carries a pair of spaced camming elements in the form of circular eccentric members 56 which are rigidly secured to shaft 52 where the shaft passes through the bearing portions of the respective bearing blocks 48 and 50. Each bearing block 48 and 50 has a circular bearing aperture for receiving one of the eccentric elements carried by shaft 52.

Adjacent its rear edge, as best seen in Fig. 5, engine mounting plate 24 is provided on each side with a slot 57 which receives a bolt member 58 whose lower end passes through one of the flange portions 32 and 34 of the respective side rails 38 and 30. The head portions of bolt members 58 project above the upper surface of engine mounting plate 24 and spring members 60 are interposed between the upper surface of mounting plate 24 and the underneath surface of washers 62 which are positioned beneath the head portions of the respective bolt members 58.

The output shaft of engine 22 is connected by means of a belt 64 to a pulley 66 mounted on a vertical shaft 68 which passes through upper casing portion 14 and through the interior of a gear casing 70 (Fig. 2) attached to the underneath surface of casing portion 14. A shaft 71, which may be a continuation of shaft 68, projects below gear casing 70 and supports at its lower end a rotary cutting member 72. Disposed within gear casing 70 are direction changing gears of any suitable type.

Projecting horizontally outwardly from gear casing 70 and driven by the gearing disposed within the gear casing is a shaft 74 which carries at its outer end a sprocket for receiving one end of a drive chain 76. A shaft 78 is supported for rotation above casing portion 14 by means of bearing brackets 79. Suitable pulleys 80 are carried by the opposite outer ends of shaft 78 and carry drive belts 82 which engage pulleys carried by rear wheels 20. Suitable means, not shown, may be used for providing a clutching connection between rear wheels 20 and shaft 78 to control the rotation of wheels 20 when engine 22 is in operation.

In the operation of the movable engine mounting device of the invention, engine mounting plate 24 is normally disposed in the full-line position shown in Fig. 5 when the engine is in operation. In this position of the engine mounting plate, belt 64 is tight and transmits power to vertical shaft 68 and thence to cutter member 72 and rear wheels 20. In the full-line position of mounting plate 24, each of the eccentric elements 56 is in the full-line position shown in Fig. 5 in which the major portion of the eccentric area lies rearwardly of the axis of shaft 52.

In starting the engine, the driving connection between the engine and the mechanism driven through shaft 68 may be disconnected by rotating operating handle 54 on shaft 52 slightly more than 180 degrees in a clockwise direction with respect to the views shown in the drawings to thereby raise the forward end of mounting plate 24 upwardly and, at the same time, to move plate 24 forwardly until it reaches the dotted-outline position shown in Fig. 5 corresponding to the dotted-outline position of the eccentric element shown in Fig. 5. This causes engine 22 to be shifted forwardly and loosens drive belt 64 to interrupt power transmission from engine 22 to shaft 68. Shaft 52 is moved through an angle of slightly more than 180 degrees so that the handle 54 tends to remain locked in either extreme position to which it is actuated due to the fact that the eccentrics are moved through an over-center position during their movement of slightly more than 180 degrees. During the movement of mounting plate 24, the rear end of the mounting plate is biased downwardly by springs 60 which bear downwardly on the rear surface of the mounting plate.

To tighten belt 64, operating handle 54 is rotated slightly more than 180 degrees in a counterclockwise direction to cause eccentric elements 56 to rotate from the dotted-outline position of Fig. 5 to the full-line position of that figure. This causes the forward end of mounting plate 24 to be lifted upwardly and the plate is moved rearwardly to thereby move engine 22 rearwardly and tighten drive belt 64. At the end of the movement of eccentric elements 56, plate 24 is again horizontal but has been shifted rearwardly sufficiently to tension belt 64.

In an operating embodiment which has been built in accordance with the invention, the eccentric elements 56 lift mounting plate 24 about one-quarter inch and move the plate forwardly or rearwardly about one-half inch during the movement of the eccentric elements 56.

The use of slots 44 for connecting blocks 48 and 50 to the underneath surface of mounting plate 24 permits an adjustment of the position of mounting plate 24 relative to the bearing blocks to assure proper tension on the belt. After the mounting plate has been properly positioned to give the correct belt tension, screws 46 may then be tightened to hold mounting plate 24 in a fixed position relative to bearing blocks 48 and 50.

The use of eccentric elements for imparting a movement to the engine mounting plate to either release or restore tension on the drive belt provides an easy and efficient means of controlling the connection of the engine to the load when the engine is being started. The lifting action provided by the eccentrics reduces to a minimum the sliding friction between the moving engine mounting plate and the side rails which support the mounting plate. This eliminates the necessity of having machined upper surfaces on the side rails to reduce friction. It also reduces paint scuffing, scratching and the like.

While a particular embodiment of the invention has been shown and described, it will be obvious to those skilled in the art that various changes and modifications may be made therein without departing from the invention and, therefore, it is aimed to cover all such changes and modifications as fall within the true spirit and scope of the invention.

What I claim as my invention is:

1. A power unit comprising a prime mover, means driven by said prime mover, and means for moving said prime mover relative to said driven means to control transmission of power from said prime mover to said driven means comprising a mounting plate for said prime mover, a pair of oppositely disposed vertically upstanding support members for said mounting plate, a shaft rotatably supported by said support members and disposed beneath said mounting plate, bearing blocks attached to said mounting plate and extending downwardly from the underneath surface of said mounting plate, and eccentric means carried by said shaft and disposed within and engaging said bearing blocks, said mounting plate being movable relative to said support members in response to rotation of said shaft and said eccentric means.

2. A power unit comprising a prime mover, means driven by said prime mover, and means for moving said prime mover relative to said driven means to control transmission of power from said prime mover to said driven means comprising a mounting plate for said prime mover, a pair of oppositely disposed vertically upstanding support members for said mounting plate, a shaft rotatably supported by said support members and disposed beneath said mounting plate, bearing blocks attached to said mounting plate and extending downwardly from the underneath surface of said mounting plate, and eccentric means carried by said shaft and disposed within and engaging said bearing blocks, said mounting plate being shiftable vertically and longitudinally relative to said support members in response to rotation of said shaft and said eccentric means.

3. A power lawn mower comprising a housing, a prime mover carried on said housing, means carried by said housing and driven by said prime mover, and means for moving said prime mover relative to said driven means to control transmission of power from said prime mover to said driven means comprising a mounting means for said prime mover, a support for said mounting means disposed on the outer surface of said housing for supporting said mounting means above said housing, said mounting means being movable relative to said support, bearing means carried by said mounting means, eccentric means rotatably supported by said support and engageable with said bearing means, and means connected to said eccentric means to rotate said eccentric means to move said mounting means relative to said support in a direction toward and away from said driven means.

4. A power unit comprising a frame, a prime mover mounted upon said frame for movement between a first and a second position upon said frame, means on said frame driven by said prime mover, means connected between said prime mover and said driven means to transmit power from said prime mover to said driven means, and means for moving said prime mover between said first and said second positions to control said means for transmitting power comprising a shaft rotatably journaled in said frame, an eccentric fixed to said shaft for rotation therewith, bearing means on said prime mover receiving said eccentric, said eccentric being oriented with respect to said prime mover to permit said prime mover to rest upon said frame when in said first or said second position and to elevate said prime mover with respect to said frame when said shaft is rotated to move said prime mover from one of said positions to the other.

5. A power unit comprising a frame, a prime mover resting upon said frame, driven means supported upon said frame at one side of said power unit, means connected between said prime mover and said driven means to transmit power from said prime mover to said driven means, and means for moving said prime mover toward and away from said driven means to control said means for transmitting power comprising a shaft rotatably journaled in said frame, an eccentric fixed to said shaft for rotation therewith, bearing means on said prime mover receiving said eccentric, means connected to said shaft to rotate said shaft to move said prime mover toward and away from said driven means, said prime mover being elevated with respect to said frame during said movement, means upon said frame for guiding said prime mover during said movement, and means upon said frame for adjustably establishing limits to said movement at locations whereat said prime mover rests upon said frame.

6. A lawn mower comprising a frame, a rotary power shaft journaled in said frame, an engine support mounted upon said frame at one side of said power shaft, an engine mounted upon said support, means connected between said engine and said power shaft to transmit power from said engine to said power shaft, and means for moving said engine upon said support toward and away from said power shaft to control said means for transmitting power comprising a shaft rotatably journaled in said support, an eccentric fixed to said shaft for rotation therewith, a bearing block mounted upon said engine rotatably receiving said eccentric, and means connected to said shaft to rotate said shaft to move said engine toward or away from said power shaft and to elevate said engine with respect to said support during said movement.

7. A power mower comprising a frame, a power shaft journaled in said frame, an engine support fixedly secured to said frame at one side of said power shaft, said support including a pair of spaced side rails, an engine including a mounting plate adapted to rest upon said side rails, means connected between said engine and said power shaft to transmit power from said engine to said power shaft, and means for moving said engine toward and away from said power shaft to control said means for transmitting power comprising a shaft rotatably journaled in said side rails, a pair of eccentrics fixed to said shaft at spaced locations between said side rails, bearing blocks mounted upon said engine mounting plate and depending therefrom to rotatably receive said eccentrics, means connected to said shaft journaled in said side rails to rotate said journaled shaft between a first and a second position to move said engine toward and away from said power shaft.

8. A power mower as recited in claim 7, including means connected to said engine mounting plate for adjustably locating said bearing blocks upon said plate.

9. A power mower as recited in claim 7 wherein said engine mounting plate has walls defining a plurality of elongated slots extending through said mounting plate, there being a slot located over each side rail, and a guide member extends upwardly from each side rail and through each slot in said engine mounting plate, each guide member extending upwardly from each side rail engaging the walls of the slot with which said guide member is associated to guide said engine during movement toward and away from said power shaft.

10. A power mower as recited in claim 9 wherein each guide member projecting upwardly from each side rail has a spring member connected thereto and each spring member bears against the upper surface of said engine mounting plate to maintain at least a portion of said engine mounting plate in contact with said side rails during movement of said engine toward and away from said power shaft.

References Cited in the file of this patent

UNITED STATES PATENTS

| | | |
|---|---|---|
| 1,736,972 | Hutchinson | Nov. 26, 1929 |
| 2,368,362 | Johnstone | Jan. 30, 1945 |
| 2,641,889 | Bright | June 16, 1953 |
| 2,748,553 | Funk | June 5, 1956 |